May 6, 1930.  W. P. ELWOOD  1,757,078
LOAF INVERTING MECHANISM FOR PROOFERS
Filed Dec. 15, 1928  2 Sheets-Sheet 1
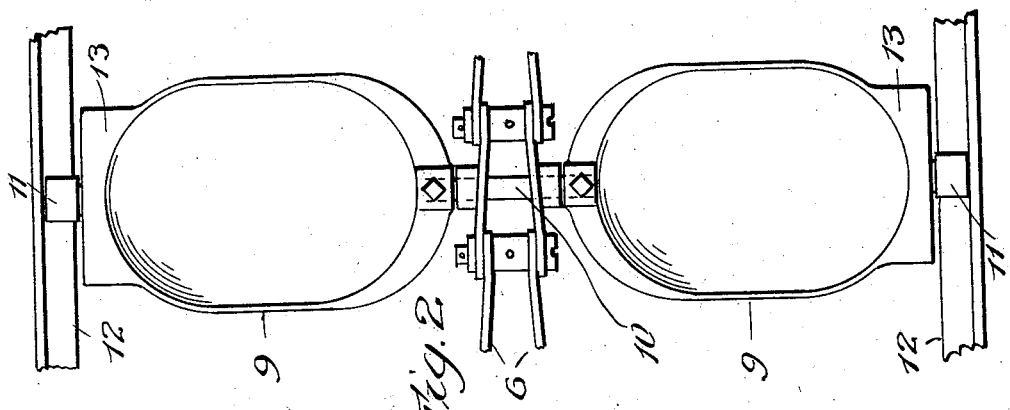
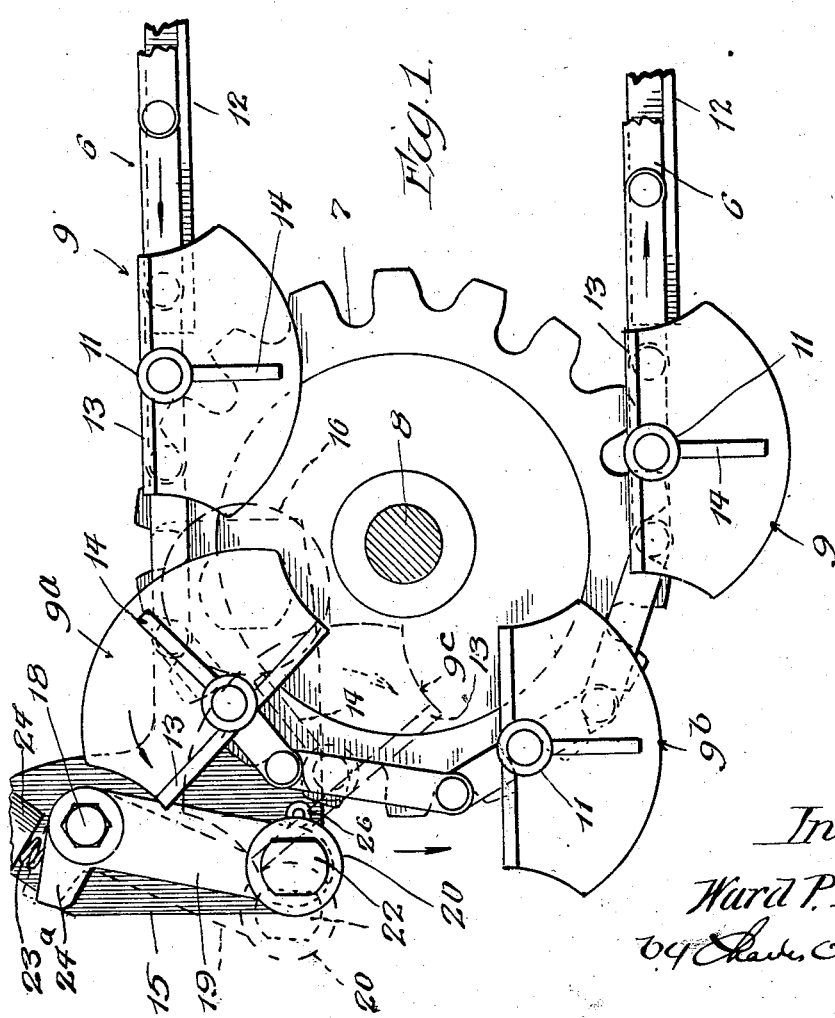
Inventor.
Ward P. Elwood

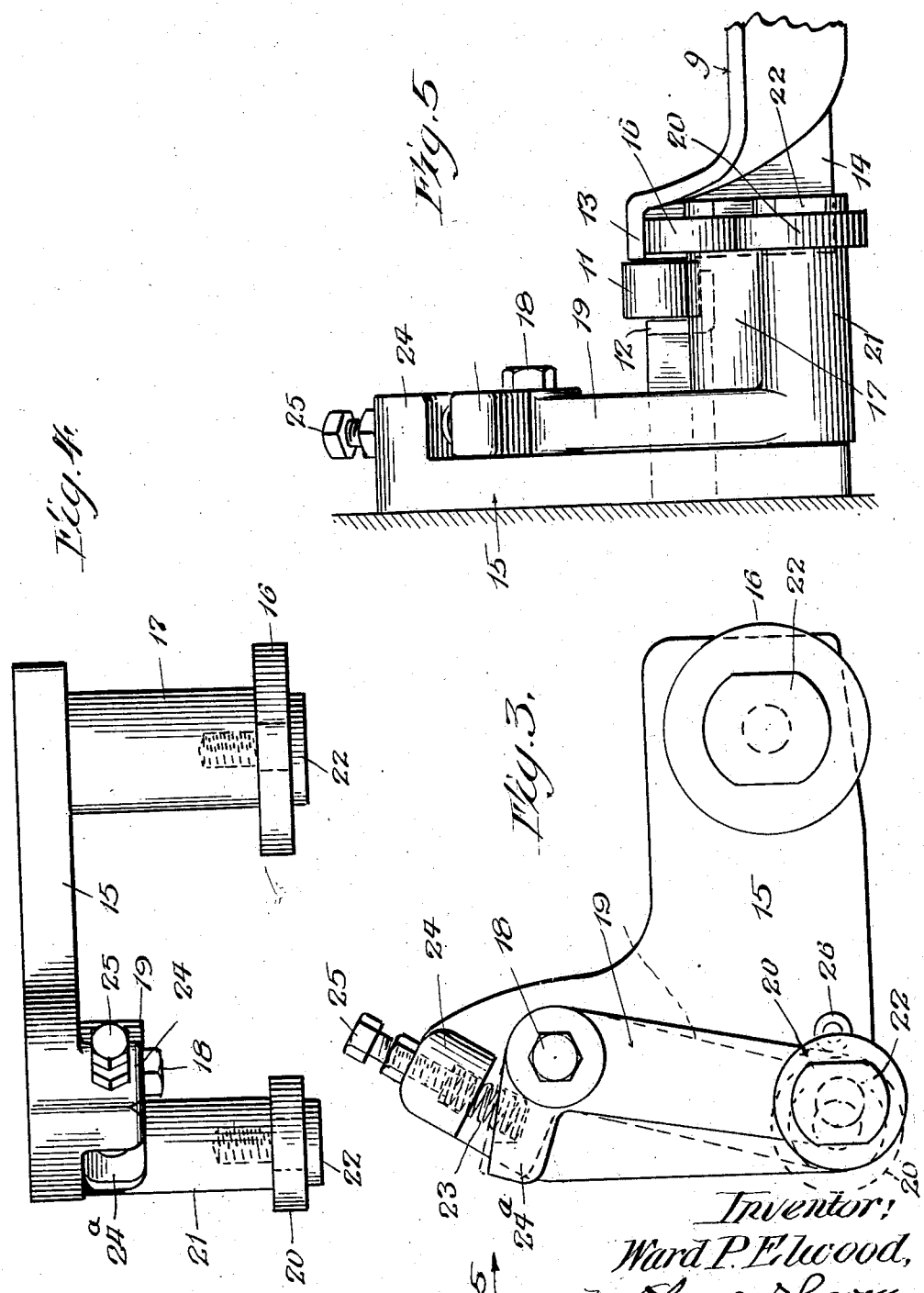

Patented May 6, 1930

1,757,078

UNITED STATES PATENT OFFICE

WARD P. ELWOOD, OF JOLIET, ILLINOIS, ASSIGNOR TO UNION MACHINERY COMPANY, OF JOLIET, ILLINOIS, A CORPORATION OF ILLINOIS

LOAF-INVERTING MECHANISM FOR PROOFERS

Application filed December 15, 1928. Serial No. 326,265.

This invention relates to loaf inverting mechanism for proofers, and its principal object is to provide novel means in loaf inverting mechanism for eliminating the shock and jar usually occasioned when the buckets or other carrying elements for the loaves are being tilted for the purpose of dumping the loaves from one bucket into another to invert the loaves.

The invention has particular reference to that type of proofers wherein dough carrying buckets are connected to and propelled by a chain or chains through the chamber of the proofer, which chain passes around sprocket wheels at the ends of the chamber, and the mechanism herein contemplated is employed adjacent one or more of the sprocket wheels whereby the buckets may be inverted as they pass the sprocket wheels associated with the loaf inverting mechanism, thereby dumping the loaves in inverted condition into other buckets. It has been found that the buckets in being tilted and assuming their normal suspended condition, heretofore were subject to considerable shock and jar, and owing to slight variations in the size of the buckets, additional machine work was necessary to enable them to be used with the inverting mechanism. An object of this invention is to provide cushioning means whereby the shocks and jars are entirely eliminated, and whereby the necessity for such extra machine work on the buckets is eliminated.

The invention consists, therefore, in loaf inverting mechanism for proofers having cushioned bucket righting elements co-operating with bucket inverting elements arranged to tilt and right the buckets as they pass over sprocket wheels at the stations where the loaves are inverted. It further consists in the several novel features hereinafter fully set forth and claimed.

The invention is clearly illustrated in the drawings accompanying this specification in which—

Figure 1 is a fragmental view, partly in side elevation and partly in vertical longitudinal section, of a conveyor chain with buckets thereon and a sprocket wheel over which the conveyor chain is trained, and showing a simple embodiment of the present invention applied thereto;

Fig. 2 is a plan of a pair of buckets and fragments of the conveyor chain and supporting rails;

Fig. 3 is a detail side elevation of one of the bucket inverting devices;

Fig. 4 is a plan thereof; and

Fig. 5 is an end elevation looking in the direction of the arrow 5 in Fig. 3, and showing in connection therewith a fragment of one of the buckets.

Referring to said drawings, the reference character 6 designates a conveyor chain such as is commonly employed in the bucket type proofers. Usually said chain extends back and forth in a horizontal direction through an elongated chamber and is trained over sprocket wheels 7 mounted at the ends of the chamber upon suitable shafts 8 which are journaled in bearing boxes carried by the walls or framework of the proofer. The buckets 9 are usually arranged in pairs, one bucket on each side of the conveyor chain and connected thereto by a pin or short shaft 10 rigidly secured in ears formed on the buckets and rotatably mounted in bosses formed on the links of the conveyor chain.

Upon the outer ends of the bucket are rollers 11 which are in co-axial alignment with the pins 10 and travel upon rails 12 supported by the walls or framework of the proofer. The rails extend between the sprocket wheels 7 and carry the weight of the buckets, and at the places where the conveyor chain passes around the sprocket wheels, the buckets are suspended from the sprocket wheels. The buckets are formed with laterally extending horizontal flanges 13 along their upper end edges and with upright flanges 14 along their end faces, which flanges co-operate with certain members of the inverting mechanism to invert the buckets as they pass around the sprocket wheels and thereby discharge the contents therefrom in inverted condition into the next adjacent bucket therebelow.

Adjacent one or more of the sprocket wheels is the loaf inverting mechanism forming the subject matter of the present specification. There are two inverting devices at each station, one at each side of the chamber, but inasmuch as both are similar, a description of one will suffice for both. Bolted or otherwise secured to each side wall of the proofer is a supporting bracket 15 upon which is journaled a roller 16 which is arranged in the path of travel of the upright flanges 14 of the buckets (see Fig. 5). The roller 16 is usually spaced some distance away from the supporting bracket 15 and, as shown, the latter is provided with a laterally extending lug 17 (see Fig. 4) which forms the support for the roller 16. The flanges 14 of the buckets encounter the roller 16 as they pass over the sprocket wheel and are thereby inverted as shown by the bucket 9a.

Pivotally mounted upon the supporting bracket 15, as by a bolt 18, is an arm 19 which carries upon its lower end a roller 20 arranged in the path of movement of the flanges 13 of the buckets while in inverted position. As shown, the arm 19 is provided with a laterally extending lug 21 which forms the support for the roller 20. The rollers 16 and 20 may be rotatably mounted upon the lugs 17 and 21 by stud pins 22 threadedly secured in the lugs. The arm 19 is spring pressed toward the right as viewed in Fig. 1 by a coiled compression spring 23 which is held under compression between the supporting frame 15 and the arm 19.

As shown, the supporting frame is formed with a recessed lug 24 located above the arm 19, and said arm is formed with a recessed angular extension or lug 24a in which the coiled compression spring 23 is contained. An adjustment stud 25 is threadedly mounted in the lug 24 and provides means for regulating the tension of the spring 23. A rubber or other bumper 26 is secured to and projects from the side of the supporting bracket 15 in position to hold the arm 19 in proper position to receive the impact from the buckets as they pass over the sprocket wheel in inverted condition.

The bucket inverting device is so located with respect to the path of movement of the buckets as they pass around the sprocket wheel, that the flanges 13 will pass over the roller 16 while the flanges 14 encounter the roller 16 and the buckets are tilted into the inverted position taken by the bucket 9a in Fig. 1, where it will be seen that the bucket is inverted with the flange 14 traveling over the roller 16. In this or about this position, the contents of the buckets are discharged therefrom in an inverted condition into the next adjacent bucket therebelow, designated by 9b, which at that time is empty.

As the bucket 9a continues to travel around the axis of the shaft 8 of the sprocket wheel, the flange 13 encounters the roller 20, and because of the yielding connection between said roller carrying arm and the supporting bracket, the roller is free to yield, thereby taking up any jar occasioned by the bucket striking against it, and, at the same time, permitting the flanges 13 and 14 of the bucket to pass between the rollers 16 and 20. This position of the bucket is indicated by one shown in dotted lines at 9c. Any variation in the length of the flanges 13 and 14 is compensated for by the spring 23.

As the bucket continues its downward movement around the axis of the shaft 8, the spring pressed roller 20 swings the bucket back toward its upright position which it assumes just in advance of the time when the next adjacent bucket thereabove is being tilted to discharge its contents. It will be observed when the buckets are inverted while passing around the sprocket wheels that the loaves of bread contained therein are inverted, so that the sides thereof which previously were uppermost fall upon the bottom of the buckets, thereby leaving them in inverted condition.

It will be observed that in case the flanges 13 and 14 of any of the buckets are longer than they should be, the spring 23 will permit the arm 19 to yield further, thereby enabling the flanges to pass between the rollers 16 and 20. Furthermore, the action of the spring pressed roller 20 upon the flanges 13 is to aid in righting the buckets, and from actual experience, it has been found that the buckets are righted without much, if any, oscillation or swinging movements thereof after they pass between the inverting mechanism, which is important, since the empty buckets should be in righted position immediately after passing the inverting mechanism to receive the loaves from the next adjacent buckets thereabove.

More or less variation of the exact details of construction is possible without departing from the spirit of this invention. I desire, therefore, not to limit myself to the exact form of the construction shown and described, but intend, in the following claims, to point out all of the invention disclosed herein.

I claim as new, and desire to secure by Letters Patent:

1. In loaf inverting mechanism for proofers, the combination with a conveyor chain, invertible buckets suspended therefrom each having a vertical rib on an end wall thereof, and a sprocket wheel over which said conveyor chain is trained, of a stationarily mounted bucket inverting member lying in the path of movement taken by the ribs of the buckets over the sprocket wheel, and a yieldably mounted bucket righting element lying in the downward path of movement taken by the buckets around the sprocket wheel and yielding to permit the buckets to pass between the bucket inverting member and the bucket righting element.

2. In loaf inverting mechanism for proofers, the combination with traveling suspended buckets each having horizontal and vertical flanges upon their outer ends, and means for directing movement of said buckets along an arc of a circle, of a stationarily mounted bucket inverting element lying in the path of movement of the vertical flanges of the buckets and arranged to be encountered by said flanges whereby the buckets are inverted when passing over said element, and a yieldingly mounted bucket righting element lying in the downward path of movement of the horizontal flanges of the buckets when inverted and yielding to permit the buckets to pass between the stationary bucket inverting element and the bucket righting element.

3. In loaf inverting mechanism for proofers, the combination with traveling suspended buckets each having horizontal and vertical flanges upon their outer ends, and means for directing movement of said buckets along an arc of a circle, of a stationarily mounted roller arranged to be encountered by the vertical flanges of the buckets whereby the buckets are inverted as they pass over said roller, and a spring pressed arm adjacent said roller and having a roller arranged to be encountered by the horizontal flanges of the buckets when inverted.

4. In loaf inverting mechanism for proofers, the combination with traveling suspended buckets each having horizontal and vertical flanges upon their outer ends, and means for directing movement of said buckets along an arc of a circle, of a stationarily mounted roller arranged to be encountered by the vertical flanges of the buckets whereby the latter are inverted as they pass over said roller, and a spring pressed arm having a roller thereon spring pressed toward the first mentioned roller and lying in the path of movement of the horizontal flanges of the bucket when inverted, said spring pressed arm serving to compensate for variations in the flanges of the buckets.

5. In loaf inverting mechanism for proofers, the combination with a conveyor chain, a sprocket wheel around which said chain is trained, and buckets tiltably suspended by said conveyor chain and having horizontal and vertical flanges upon their outer ends, of a supporting bracket located adjacent said sprocket wheel, a bucket inverting roller journaled upon said bracket and lying in the path of movement of the vertical flanges of the buckets and arranged to be encountered by said flanges whereby the buckets are inverted as they pass over said roller, an arm pivotally mounted upon said bracket and having a roller journaled upon its free end and arranged to be encountered by the horizontal flanges of the buckets when inverted, and a spring interposed between said bracket and arm and arranged to yieldingly hold said arm and therewith the roller carried thereby toward the other roller.

6. In loaf inverting mechanism for proofers, the combination with a conveyor chain, a sprocket wheel around which said chain is trained, and buckets tiltably suspended by said conveyor chain and having horizontal and vertical flanges upon their outer ends, of a supporting bracket located adjacent said sprocket wheel, a bucket inverting roller journaled upon said bracket and lying in the path of movement of the vertical flanges of the buckets and arranged to be encountered by said flanges whereby the buckets are inverted as they pass over said roller, an arm pivotally mounted upon said bracket and having a roller journaled upon its free end and arranged to be encountered by the horizontal flanges of the buckets when inverted, and a coiled compression spring interposed between lugs formed on the supporting bracket and arm and acting to yieldingly hold the roller carried by said arm towards the other roller.

7. In loaf inverting mechanism for proofers, the combination with a conveyor chain, a sprocket wheel around which said chain is trained, and buckets tiltably suspended by said conveyor chain and having horizontal and vertical flanges upon their outer ends, of a supporting bracket located adjacent said sprocket wheel, a bucket inverting roller journaled upon said bracket and lying in the path of movement of the vertical flanges of the buckets and arranged to be encountered by said flanges whereby the buckets are inverted as they pass over said roller, an arm pivotally mounted upon said bracket and having a roller journaled upon its free end and arranged to be encountered by the horizontal flanges of the buckets when inverted, a coiled compression spring interposed between lugs formed on the supporting bracket and arm and serving to yieldingly hold the roller carried by the arm towards the other roller, and an adjustment stud carried by the lug of the supporting bracket and arranged to vary the tension of said coiled spring.

WARD P. ELWOOD.